W. J. BAYRER, DEC'D.
H. H. BAYRER, ADMINISTRATOR.
LUBRICATING MEANS.
APPLICATION FILED SEPT. 18, 1919.

1,398,936.

Patented Nov. 29, 1921.

Inventor:
William J. Bayrer
By his Attorney,

UNITED STATES PATENT OFFICE.

WILLIAM J. BAYRER, OF HARTFORD, CONNECTICUT; HOMER H. BAYRER, ADMINISTRATOR OF SAID WILLIAM J. BAYRER, DECEASED, ASSIGNOR TO ROBERT G. HENRY, OF WEST HARTFORD, CONNECTICUT.

LUBRICATING MEANS.

1,398,936.          Specification of Letters Patent.      Patented Nov. 29, 1921.

Application filed September 18, 1919. Serial No. 324,631.

*To all whom it may concern:*

Be it known that I, WILLIAM J. BAYRER, a citizen of the United States, residing in the city of Hartford, county of Hartford, and State of Connecticut, have invented certain new and useful Improvements in Lubricating Means; and I do declare the following to be a full, clear, and exact description of the same, reference being had to the accompanying drawings, forming a part of this specification, and to the characters of reference marked thereon.

This invention relates to lubricating means. In certain cases where vertical or substantially vertical shafts are supported in annular ball bearings, it is impractical to keep the bearings immersed in oil, or in fact to provide an arrangement such that the oil will not drain away from the ball races. When such drainage takes place the bearing, if neglected, soon becomes dry and serious injury follows. The object of the present invention is the provision of means whereby the lubricant drainage from a bearing of the type mentioned may be repeatedly collected and returned to the ball races. To this end the invention consists in a novel and compact arrangement of parts including a simple lubricant collector and a distributer disposed in close proximity to the bearing to be lubricated and operable to set up a circulation of lubricant which is directed to the engaging surfaces of said bearing.

Figure 1:
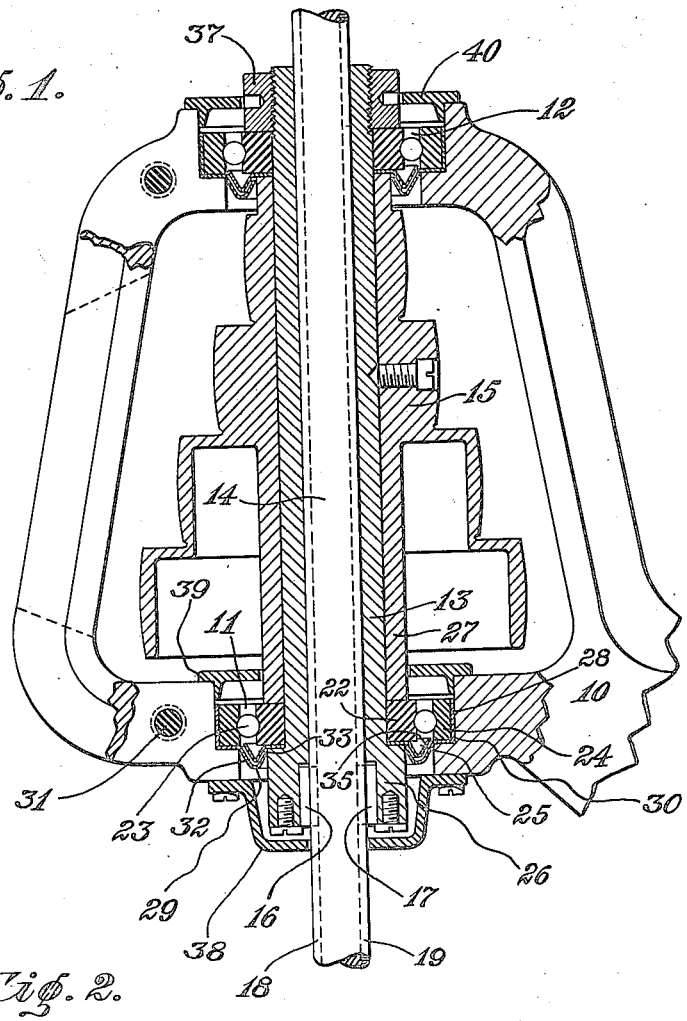
Figure 2:
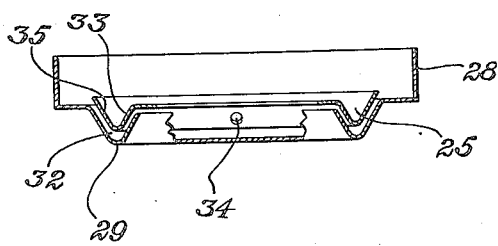

In the accompanying drawings which illustrate one form of embodiment of the invention as employed in connection with a drilling machine, such as illustrated in my United States Patent No. 1,259,343, of March 12th, 1918, Figure 1, is a sectional view of a drill spindle driving pulley supported by bearings with which are associated the lubricating means included in said invention. Fig. 2, is a detail view of a lubricant collector and distributer, drawn to a larger scale than Fig. 1.

Referring to the drawings, certain parts characteristic of a well known type of drilling machine may be briefly described as follows. The bracket 10, supports in annular ball bearings 11 and 12, the sleeve 13, through which extends the spindle 14. For the purpose of rotating sleeve 13, at suitable and different speeds to be imparted to the spindle it has secured thereto the stepped pulley 15. The spindle rotates with the sleeve by virtue of driving keys 16 and 17, which respectively engage spindle splines 18 and 19, the latter being extended to permit of longitudinal movement of the shaft or spindle with respect to its driving element to thereby effect feed as of a drill or other tool which may be associated therewith but which is not herein shown.

Bearing 11, is made up of inner ring 22, balls 23, and outer ring 24. The inner ring together with a lubricant conveyer or distributer 25, is held between a head 26, at one end of sleeve 13, and the end of pulley hub 27, while the outer ring 24, surrounded by the flange 28, of lubricant container 29, is received by a counterbore 30, in bracket 10, wherein said ring and container are clamped by a bolt 31, extending transversely through a split part of the bearing support or bracket. The lubricant container 29, is formed with an annular groove 32, into which depends a similarly formed part of lubricant distributer 25. The inclined wall 33, of distributer 25, is perforated as at 34, and the inclined wall 35, is extended into the race for balls 23. With a supply of fluid lubricant within the groove of the container, it will be clear from the foregoing description that a certain amount of lubricant will flow into the groove of the distributer, then as the latter rotates with the spindle it follows that lubricant expelled from the groove of the distributer by centrifugal force will be directed by the inclined wall 35, to the ball race, thereby insuring ample lubrication for the bearing. It will be obvious that lubricant that drains away from the ball race will flow into the groove 32 and thus be repeatedly taken up by the distributer and delivered to the parts of the bearing where lubrication is essential.

In a like manner the bearing 12, is provided with a lubricating device which need not be described in detail as it is a counterpart of the one associated with bearing 11. It will be noted that the sleeve 13 and the pulley secured thereto are held in proper relation to the bearings by the nut 37, which is threaded on to that end of the sleeve opposite to the head 26. As said head extends below the bracket opening therefor, a protective cap as 38, may be secured to the bracket. Also the counterbores for the ball bearings may be provided with suitable caps as 39 and 40, to exclude extraneous matter.

Having thus described my invention what I claim is,—

1. Lubricating means including in combination with a bearing support, a shaft or spindle extending therethrough, and an annular ball bearing interposed in substantially horizontal relation between the bearing support and the spindle, a lubricant container comprising an annularly grooved member associated with the non-rotative member of the ball bearing, and a lubricant distributer having an inclined wall depending into the groove of the container and extending toward the ball race, the distributer being adapted to rotate with the spindle, whereby centrifugal force will cause lubricant on the inclined wall of the distributer to be directed into the ball race.

2. Lubricating means including in combination with a bearing support, a shaft or spindle extending therethrough, and an annular ball bearing interposed in substantially horizontal relation between the bearing support and the spindle, a lubricant container having an annular groove below the ball race of the bearing, and a lubricant distributer depending into the groove of the container with a perforated wall and an inclined wall, the latter being extended toward the ball race.

3. In a lubricating device for a bearing on a vertically disposed spindle, the combination of an oil receptacle surrounding the spindle, and an annular member attached to said spindle so as to rotate therewith, said member depending into said receptacle and the outer face thereof flaring upwardly and outwardly.

4. In a lubricating device for a bearing on a vertically disposed spindle, the combination of an oil receptacle surrounding the spindle, and a cup-shaped member attached to said spindle so as to rotate therewith, said member depending into said receptacle and having its annular wall recurved to flare upwardly and outwardly.

WILLIAM J. BAYRER.